(12) United States Patent
Hamilton, II et al.

(10) Patent No.: US 9,665,907 B2
(45) Date of Patent: May 30, 2017

(54) AUTOMATED TRANSACTIONAL CARBON OFFSETTING

(75) Inventors: Rick A. Hamilton, II, Charlottesville, NY (US); James R. Kozloski, New Fairfield, CT (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2667 days.

(21) Appl. No.: 12/330,545

(22) Filed: Dec. 9, 2008

(65) Prior Publication Data
US 2010/0145833 A1    Jun. 10, 2010

(51) Int. Cl.
| | |
|---|---|
| G06Q 50/00 | (2012.01) |
| G06Q 10/00 | (2012.01) |
| G06F 17/00 | (2006.01) |
| G06Q 40/02 | (2012.01) |
| G06Q 20/04 | (2012.01) |
| G06Q 20/10 | (2012.01) |
| G06Q 20/22 | (2012.01) |
| G06Q 30/02 | (2012.01) |
| G06Q 30/06 | (2012.01) |
| G07F 13/02 | (2006.01) |
| G06Q 40/00 | (2012.01) |

(52) U.S. Cl.
CPC ............ *G06Q 40/02* (2013.01); *G06Q 20/04* (2013.01); *G06Q 20/10* (2013.01); *G06Q 20/227* (2013.01); *G06Q 30/0283* (2013.01); *G06Q 30/0603* (2013.01); *G06Q 40/12* (2013.12); *G07F 13/025* (2013.01)

(58) Field of Classification Search
USPC .............................................. 705/15, 30, 413
See application file for complete search history.

(56) References Cited

U.S. PATENT DOCUMENTS

| | | | |
|---|---|---|---|
| 6,601,033 B1 * | 7/2003 | Sowinski ............... | G06Q 10/30 705/308 |
| 6,780,220 B2 * | 8/2004 | Milbrath ................ | B22D 1/002 75/602 |
| 7,426,489 B2 * | 9/2008 | van Soestbergen ... | G06Q 30/06 705/37 |

(Continued)

*Primary Examiner* — Talia Crawley
(74) *Attorney, Agent, or Firm* — Patrick J. Daugherty; Driggs, Hogg, Daugherty & Del Zoppo Co., LPA

(57) ABSTRACT

Methods, including service methods, articles of manufacture, systems, articles and programmable devices are provided for linking and utilizing monetary and carbon credit accounts through a programmable arbitrating device providing a transaction interface to the buyer. A composite price is set for an item having a monetary portion and a carbon credit portion, a buyer executing a purchase of the item through an input to the arbitrating device transaction interface, the arbitrating device automatically charging a monetary payments from the buyer's monetary account, carbon credit payments from the buyer's carbon credit account, a difference between the payments and the composite price debited to the buyer's carbon credit account balance for a monetary value of the difference as a function of a monetary-carbon exchange rate, or to the buyer's monetary account for a carbon credit value of the difference as a function of the monetary-carbon exchange rate.

17 Claims, 3 Drawing Sheets

(56) References Cited

U.S. PATENT DOCUMENTS

| | | | |
|---|---|---|---|
| 2002/0143616 A1* | 10/2002 | Hajdukiewicz | G06Q 30/02 705/14.15 |
| 2002/0143693 A1* | 10/2002 | Soestbergen | G06Q 30/06 705/37 |
| 2004/0249732 A1 | 12/2004 | Drummond | |
| 2005/0154669 A1* | 7/2005 | Streetman | G06Q 99/00 705/38 |
| 2005/0273358 A1* | 12/2005 | Zimmerman | G06Q 10/04 705/308 |
| 2006/0089851 A1* | 4/2006 | Silby | G06Q 40/00 705/500 |
| 2006/0241951 A1* | 10/2006 | Cynamom | G06Q 30/02 705/1.1 |
| 2007/0233616 A1* | 10/2007 | Richards | G06Q 10/06 705/400 |
| 2007/0255457 A1 | 11/2007 | Whitcomb et al. | |
| 2008/0249965 A1* | 10/2008 | Pollack | G06Q 30/0603 705/413 |
| 2009/0055304 A1* | 2/2009 | Lange | G06Q 40/04 705/37 |
| 2009/0132386 A1* | 5/2009 | Natunen | G06Q 20/202 705/26.1 |
| 2009/0313145 A1* | 12/2009 | Hamilton, II | G06Q 10/063 705/30 |
| 2009/0319315 A1* | 12/2009 | Branscomb | G06Q 10/30 705/308 |
| 2010/0161455 A1* | 6/2010 | Robinson | G06Q 10/00 705/30 |
| 2010/0228601 A1* | 9/2010 | Vaswani | G06Q 10/06 705/308 |
| 2011/0087508 A1* | 4/2011 | McConnell | G06Q 10/06 705/7.11 |

\* cited by examiner

AUTOMATED TRANSACTIONAL CARBON OFFSETTING

FIELD OF THE INVENTION

The present invention generally describes methods, systems and devices for linking dual accounts for composite monetary and carbon credit value consideration in a transaction.

BACKGROUND OF THE INVENTION

The economic costs incurred with the purchase and use of a product may not be accurately reflected in its monetary price. For example, product sales and other transaction pricing generally does not incorporate costs associated with contribution by the product or transaction to global fossil carbon emissions, which are believed to have substantial and long term impact upon global environments and human society living conditions. One proposed solution is a carbon credit, imposed on a given product or transaction in order to cause the transacting party or parties to internalize associated carbon emission costs (sometimes referred to as a "carbon footprint").

However, estimating actual associated carbon emission costs accurately or fairly may be difficult. Agreement and consensus on the monetary value of emitting, or mitigating, carbon emissions may be difficult, resulting in difficulty in implementing carbon emission cost allocation systems and mechanisms.

SUMMARY OF THE INVENTION

Methods are provided for linking and utilizing monetary and carbon credit accounts in consideration of a transaction. Each of a buyer's monetary account and a buyer's carbon credit account are linked through a programmable arbitrating device providing a transaction interface to the buyer. A composite price is set for an item offered for sale to the buyer through the arbitrating device transaction interface, the composite price having a monetary portion and a carbon credit portion. The buyer executes a purchase of the item through an input to the arbitrating device transaction interface, and in response the arbitrating device automatically charges a monetary payment from the buyer's monetary account and a carbon credit payment from the buyer's carbon credit account, a total of the monetary and carbon credit payments less than the composite price, with a difference between the total payment and the composite price debited to the buyer's carbon credit account balance for a monetary value of the difference as a function of a monetary-carbon exchange rate, or to the buyer's monetary account for a carbon credit value of the difference as a function of the monetary-carbon exchange rate. In one aspect a total of the buyer's monetary payment, the buyer's carbon credit payment, and the difference define a total consideration for the executed purchase equal to the composite price, and the arbitrating device is configured to automatically charge the monetary payment, charge the carbon credit payment and debit the difference without requiring a further action by the buyer or the seller.

Service methods are also provided comprising deploying programmable devices or applications for linking and utilizing monetary and carbon credit accounts in consideration of a transaction according to the method steps described above, for example by a service provider who offers to implement, deploy, and/or perform functions for others. Still further, articles of manufacture comprising a computer usable medium having a computer readable program in said medium are provided. Such program code comprises instructions which, when executed on a computer system, cause the computer system to perform one or more method and/or process elements described above for linking and utilizing monetary and carbon credit accounts in consideration of a transaction. Moreover, systems, articles and programmable devices are also provided, configured for performing one or more method and/or process elements of the current invention for linking and utilizing monetary and carbon credit accounts in consideration of a transaction, for example as described above.

BRIEF DESCRIPTION OF THE DRAWINGS

These and other features of the methods, systems and devices according to the present application will be more readily understood from the following detailed description of the various aspects of the embodiments taken in conjunction with the accompanying drawings in which.

Figure 1:
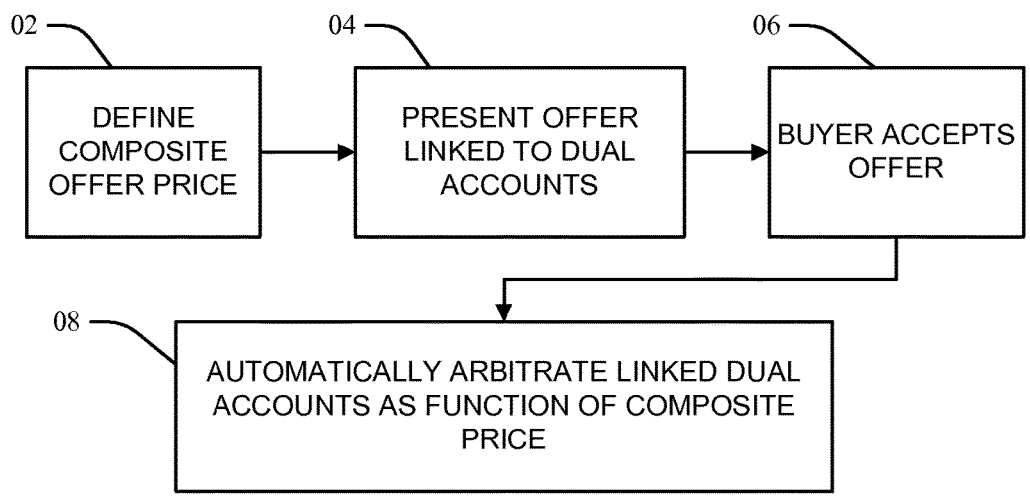
FIG. 1 is a flow chart illustrating a method and system for linking and utilizing monetary and carbon credit accounts in consideration of a transaction according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience the Detailed Description of the Invention has the following sections:
I. General Description; and
II. Computerized Implementation.

I. General Description

The present application discloses systems, methods, devices and program products for linking and utilizing monetary and carbon credit accounts in consideration of a transaction. The problem of dual accounting of monetary cost and carbon cost for retail products increases as environmental concerns surrounding the impact of fossil carbon emissions on global climate grows, resulting in increasing demand for such dual cost accounting. For example, carbon emissions are believed to trap heat and otherwise cause a world-wide increase in global temperature, sometimes referred to as "the greenhouse effect." However, the environmental and economic costs associated with carbon emission incurred with the purchase and use of a product are not generally reflected in monetary pricing, and thus monetary pricing does not directly account for the global scale and long term impact of associated fossil carbon emissions on human societies.

Proposed carbon credit solutions are generally aimed at adding to the monetary price of a product the marginal economic cost of the fossil carbon liberated in producing and/or consuming said product (i.e., its "carbon footprint"). Estimating such impacts and costs are difficult.

Some solutions provide for trading units of carbon savings, sometimes known as "carbon credits" or "carbon offsets" among carbon-emitting and carbon-sequestering entities. Sequestered carbon may itself be viewed as capital, and the use of carbon credits may be driven directly into retail transactions; accordingly, entities that sequester carbon from the atmosphere may be considered to add capital to the world, functioning much like a monetary unit mint. Such mechanisms imply the necessity of dual accounting frameworks with respect to carbon credits and monetary credits. In the case of normal monetary capital, it is known for reserve banks and other entities to control the supply of capital in a given national economy, for example controlling money supplies through modifications to interest rates and amounts of printed/tangible money. Monetary capital may also be generally invested in real world capital, or may be deposited or otherwise find a sink in an account within a lending entity (e.g. a bank).

With respect to carbon offsets and credits, capital may be considered to be invested when carbon credits are exchanged for fossil carbon emissions liberated into the atmosphere for production and/or consumption of goods, and the global atmosphere may be considered as a sink for liberated fossil carbon capital. Invested monetary capital may be returned to a money supply by selling capital or by a withdrawal of funds from an account; similarly, liberated carbon credits may be returned to a carbon credit supply by the act of sequestering carbon from the atmosphere. Carbon credit capital expansion may thus be represented by carbon sequestration, for example by means of photosynthesis or some other artificial sequestration method.

It is known to define carbon offset quantities in terms of units representing fixed tonnages of carbon sequestered from the atmosphere. However, movement away from such fixed tonnage standards permits the value of a carbon credit to be determined by the supply of carbon offsets in a carbon capital economy, and further in response to demands for fossil carbon liberation. Moreover, requiring that newly mined fossil-based carbon compounds be paid for at value set through auction mechanisms with carbon credits as well as with monetary currency enables economic structures based upon carbon to allocate carbon credits and offsets efficiently. Carbon credit and offset pricing need not be pegged to a certain value, but may then float like a currency, in one aspect setting carbon prices paid for each ton of fossil carbon liberated at a highest sequestered carbon price offered by the auction market. Furthermore, as accommodative monetary policies may result in inflation of monetary prices, efficient means of carbon sequestration from the atmosphere may similarly drive inflation in carbon prices for newly mined fossil carbon.

Thus methods and processes are needed to transfer and allocate sequestered carbon credits and carbon economy capital efficiently from sequestering entities to fossil carbon producers with the same integrity as that found in monetary systems. FIG. 1 illustrates one embodiment of the present invention for linking and utilizing monetary and carbon credit accounts in consideration of a transaction. At 02 an offer price is defined (e.g. by a seller or other offering entity, by a buyer or other purchasing entity such, or by a service provider, etc.), the offer having a composite consideration requirement or price (e.g. a price of an item offered for sale), the composite price having a monetary portion and a carbon credit portion. At 04 a possible buyer or other party (e.g. a wholesaler, a retailer, services engager, etc.) is presented with the offer through a programmable device or other automated mechanism configured to automatically arbitrate between and directly link and charge or credit both of a buyer's monetary account and a buyer's carbon credit or offset account, the arbitrating device further configured to directly link and charge or credit both of a pair of linked seller's monetary and carbon credit accounts as needed. The arbitrating device is also configured to acquire account information from and manipulate amounts of the linked buyer's monetary and carbon credit accounts and to provide a transaction interface to the buyer, seller, or other authorized party.

At 06 the buyer accepts the offer, for example agreeing to purchase an offered item, thorough an input to the interface provided by the arbitrating device, and in response to the buyer input at 08 the arbitrating device automatically executes acceptance of the buyer of the offer through automatically accessing and charging or debiting the dual accounts of each of the linked buyer's monetary and carbon credit accounts and the linked seller's monetary and carbon credit accounts, thereby executing the transaction by automatically determining and allocating each of the respective monetary and carbon credit costs in a transparent, easy, one-step process for the buyer and seller.

Figure 2:
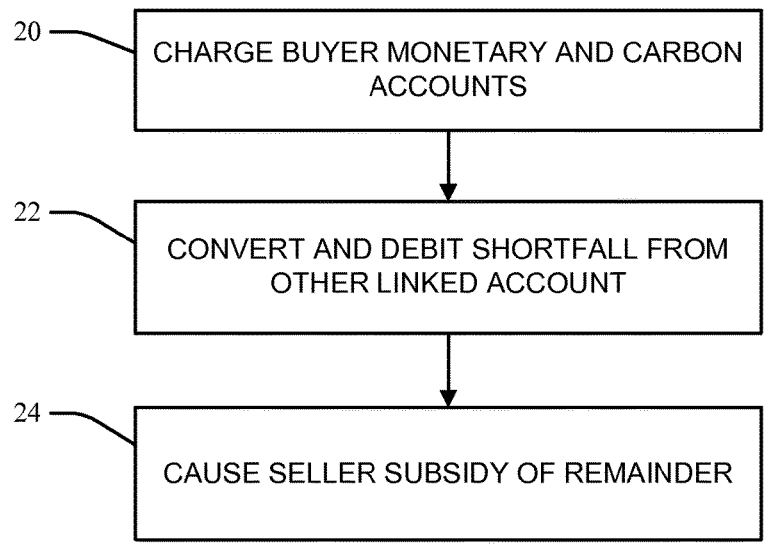
FIG. 2 is a flow chart illustrating a method and system for linking and utilizing monetary and carbon credit accounts in consideration of a transaction according to the present invention.

FIG. 2 illustrates one example of an arbitrating device according to the present invention automatically executing acceptance of the offer at 08 of FIG. 1 as described above. At 20 the arbitrating device charges a monetary payment from the buyer's monetary account in consideration of some of a monetary portion of the composite price, and also charges a carbon credit payment from the buyer's linked carbon credit account in consideration of some of a carbon credit portion of the composite price, wherein a total of the monetary payment and the carbon credit payment is less than the composite price. At 22 the arbitrating device automatically converts and debits a shortfall from one of the buyer's linked accounts from the other linked account as a function of a ratio or relationship of the monetary funds to the carbon credit values, for example by applying a present or agreed-upon monetary-carbon exchange rate. Thus the arbitrating device may debit a part of a difference between the total payment and the composite price by debiting the buyer's carbon credit account balance for a monetary value of the part of the difference as a function of the monetary-credit exchange rate, or debit the buyer's monetary value account for a carbon credit of the part of the difference as a function of the monetary-credit exchange rate.

At 24 the arbitrating device further causes the seller to subsidize any remainder of the difference. More particularly, the arbitrating device ensures an integrity in the carbon credit accounting by ensuring that a total consideration defined by the charging or debiting of the buyer's linked monetary and carbon credit accounts fully meets the composite price set, requiring any shortfall to be met through a subsidy by the seller, and further achieving this accounting certainty automatically, without requiring any further action by the buyer or the seller. This may be contrasted with prior art carbon offset and credit trading mechanisms which bifurcate and treat monetary and carbon credit accounts differently, more particularly requiring financial offer and acceptance trams in a given transaction to be met with certainty, while allowing carbon credits to be treated permissively or aspirationally, with little or no consequences to failing to meet carbon credit charge or debit commitments.

Arbitrating devices of the present invention may also be configured to cause a seller to subsidize a remainder of the difference at 24 by automatically directly or indirectly causing (or requiring a seller to effect) the debiting of a seller's monetary subsidy account for a monetary value of the remainder of the difference, or a seller's carbon credit value subsidy account for a carbon credit value of the difference. Again, arbitrating devices may also be configured to automatically convert and translate monetary and carbon credit values as necessary, thus determining a remainder monetary value from a remainder carbon credit value or a remainder carbon credit value from a remainder monetary value as a function of a monetary-credit exchange rate.

Arbitrating devices may also be configured to automatically finance debiting of a seller's monetary or carbon credit value subsidy accounts through specified mechanisms and processes, for example, debiting a seller's monetary subsidy account may trigger automatically selling carbon credits from a seller's carbon credit value subsidy account to a carbon credit purchasing entity in communication with the arbitrating device configured according to the present invention, the carbon credits sold as a function of the monetary-credit exchange rate with proceeds credited into the seller's monetary subsidy account in an amount equaling the debiting of the seller's monetary subsidy account. In another example an arbitrating device may be configured to automatically finance debiting of a seller's carbon credit value subsidy account by automatically purchasing carbon credits from a carbon credit supplier entity (e.g. a carbon banking and sequestering entity) in communication with the arbitrating device, the carbon credits purchased as a function of a monetary-credit exchange rate and in an amount equaling a debiting of the seller's carbon credit value subsidy account. In some embodiments automatically communicating with a carbon credit supplier entity or a carbon credit purchasing entity may be effected through a Transmission Control Protocol/Internet Protocol link, though other appropriate communication means and structures will be appreciated by one skilled in the art.

The arbitrating device may also be configured to arbitrate between accounts as a function of one or more preferences, including in response to monetary-carbon exchange rate thresholds. For example, a buyer, seller or service provider may set the arbitrating device to select between accounts as a function of ascertaining and comparing a monetary-carbon exchange rate to certain preferential targets. For example, arbitrating may comprise comparing a monetary-carbon exchange rate to a preference threshold, and choosing and converting amounts from either of monetary and carbon credit accounts to meet overall percentages or targets associated with meeting the preference threshold, thus selecting and converting an amount of either arbitrated account in satisfaction of specified carbon credit/monetary proportion associated with the preference threshold. Thus in one embodiment the arbitrating device is set to use all carbon credits to satisfy a composite price consideration requirement, converting some of them to satisfy the monetary value portion of the composite price, when the monetary-carbon exchange rate meets a first threshold; to debit each account equally (e.g. fifty-fifty) when the monetary-carbon exchange rate meets a second threshold (converting any amounts of the 50/50 debiting as needed to produce a total value payout in satisfaction of the composite price); or to bias debiting three-to-one (e.g. 75%/25%) in favor of one of the monetary and carbon credit accounts over the other when the monetary-carbon exchange rate meets a third threshold, etc. Preferences and thresholds may also be established to maintain a minimum, or prevent exceeding a maximum amount, in either of the monetary and carbon credit accounts, the arbitrating device thus automatically debiting and converting values in the other of the monetary and carbon credit accounts in order to observe a threshold setting, and other preferences and thresholds will be apparent to one skilled in the art.

The buyer's monetary account and the buyer's carbon credit account may be provided and administered by a single entity, for example by a credit card provider establishing the buyer's monetary account and the buyer's carbon credit account as separate sub-accounts in the buyer's name. They may also be provided by different or independent entities, wherein their linked and dual status as described above is established by an arbitrating device configured according to the present invention.

The processes described above according to the present invention may achieve incorporating carbon payment methods for goods and services directly into retail commerce in a variety of ways. In one aspect this enables producers of goods and services to pass on their carbon costs to consumers, forcing consumers to make economic decisions in accounting for carbon costs, which may ultimately reward efficient use of fossil carbon during the production of goods and services (e.g. manufacturers who emit less carbon for a given good or service may be able to directly reduce costs to the consumer accordingly, giving them a lower composite price in the marketplace relative to less-efficient, higher carbon user or producer competitors. Producers of goods and services may also choose to subsidize the carbon cost to consumers with their own in-house sequestration operations and crediting apparatus. Carbon sequestering entities may gain direct access to capital flows derived from transactions at the retail level. Consumers may also engage in activities that are rewarded directly by carbon credits to one or more personal accounts (i.e., "for-carbon work" as compared to working for monetary consideration), which may allow consumers to spend carbon credit capital so acquired during transactions involving both monetary and carbon prices, including through composite pricing and consideration arbitrating devices and processes described above.

Figure 3:
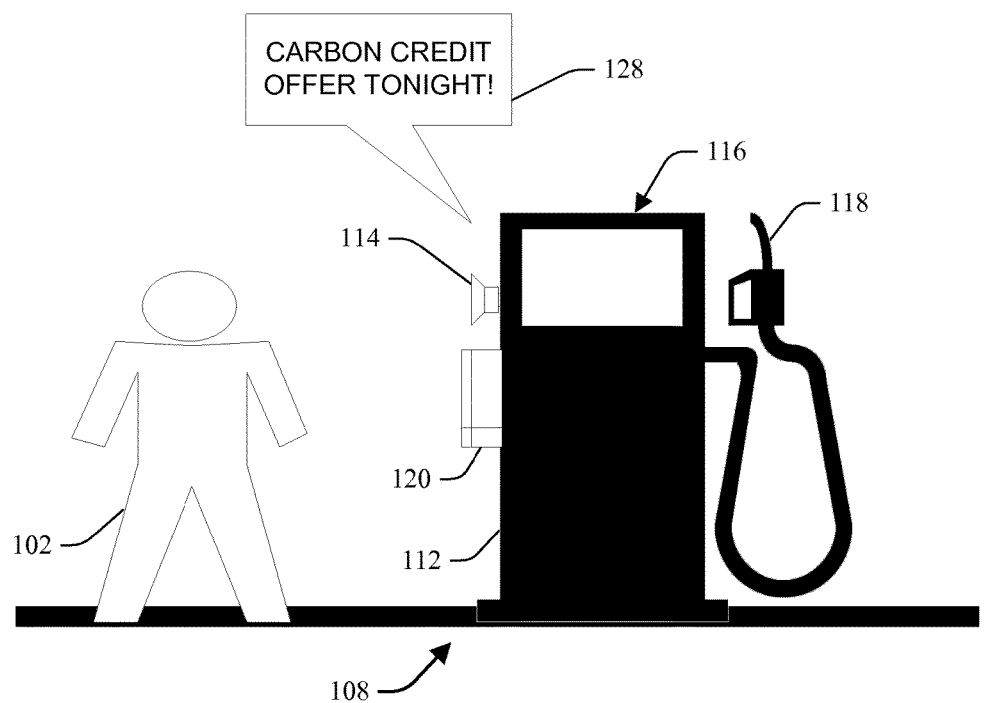
FIG. 3 is diagrammatic illustration of an implementation of a method and system for linking and utilizing monetary and carbon credit accounts in consideration of a transaction according to the present invention.

FIG. 3 provides an example of a device 112 configured to link and utilize monetary and carbon credit accounts in consideration of a transaction according to the present invention. In one example the device 112 is configured to access and link each of the buyer accounts in charging a purchase price through the processes described above. Methods of payment executed by the device 112 may include a variety of payment proportions and satisfactions, including the blended and threshold-responsive examples provided above, as well as others. Thus the device 112 may execute all dollar payments, in which carbon credits are purchased on an "as needed" basis by debiting a buyer's 102 monetary account; all carbon payments, in which a buyer 102 rich in carbon credits uses them in place of dollars, the device 112 automatically converting the carbon credits into monetary values; and blended payments from both of the buyer's 102 monetary and carbon credit accounts, in amounts as specified by a composite price, and also making up any shortfall in one account by debiting and converting monetary or carbon credits in the other account, sometimes to satisfy proportions associated with thresholds and other preferences.

In one embodiment of the invention the device 112 is a green fuel pump 112. Upon requesting the purchase of carbon-based fuel from the pump 112 a driver 102 may be informed via an audio and/or visual message 128 displayed through an audio speaker 114 and/or a display screen 116 of carbon credit and monetary composite pricing presently in effect, as well as different future pricing options (which may enable the pump 112 to encourage the purchaser 102 to defer a purchase until a future period determined to have a lower monetary or carbon credit cost). For example, the purchaser 102 may receive a message 128 that states "When you activate the gas pump nozzle, a tree will be planted. In the future, a signal will be sent to a carbon offset provider if you fill up between 8 and 10 PM. This carbon offset provider will take several actions to reduce carbon in the atmosphere."

The green fuel pump 112, and/or associated fuel station 108 system components, may map a variety of observations to carbon credits and offsets, for example a quantity of fuel purchased (e.g. number of gallons) or kind of fuel purchased, a time of day or temperature, and an elapsed time that a fuel pump 112 spout 118 is operated or left in a vehicle tank (which may allow fumes to escape). The pump 112 may also keep track of accumulated fuel purchase quantities, in one embodiment automatically calculating and triggering the provision of an amount of carbon offset by an offset provider, or debiting credits required, in response to accumulated fuel purchases, in some embodiments as a function of exceeding one or more thresholds. A signal may be sent to a carbon offset provider at various interactions points during the purchaser's 102 interaction with the fuel pump 112, for example, when the purchaser 102 operates the spout 118 (e.g. removes or replaces the sprout 118 from or into a receptacle on the pump) or engages a pump input interface 120 (e.g. presenting a credit, debit or other physical account card or token associated with the buyer's accounts card to the pump interface 120, pushing a button to select a fuel grade or turn on the pump 112, or making an entry on a keypad, etc.). Thus in some embodiments setting a relative amount or proportion of carbon credits-to-monetary value in a fueling transaction price or total consideration may be a function of mapping fueling observations and signals: thus the more gallons of fuel purchased by the purchaser 102, in some examples as a function of elapsed time periods (e.g. per week, month, year, etc.), the greater the relative level or total amount of carbon offset automatically acquired and charged, debited or subsidized in the fueling transaction.

In one exemplary scenario of using the green fuel pump 112 the purchaser 102 is a commuter 102 who has saved up carbon credits by commuting to work by train and plans to use the credits for a long leisure trip by car to a remote location. The commuter 102 receives carbon credits from his or her employer to subsidize the commute, and is free to spend them as the commuter 102 sees fit. For two months the commuter 102 has taken the train and the commuter's carbon account has grown, since train commuting has a lower carbon cost than car commuting. When the time comes to begin the trip, the carbon credits on his or her dual account credit card may show "14C." These credits, supplied to her by her employer, may have originated with a carbon reserve bank, which closely monitors the employers carbon sequestration activities and sets an exchange rate between carbon tonnage sequestered and a single carbon credit, for example currently at 2 tons/carbon credit, in one example as a result of the employer reforesting an abandoned factory site recently for which it has received 25000 carbon offsets or credits for said activities.

Furthermore, in the present scenario the carbon price of gasoline has also gone up recently, as a new carbon sequestration method was developed that has flooded the economy with carbon credits. This may be good for reversing the greenhouse effect, as commuter 102 may know and appreciate, but it also means that the carbon salary he or she received from the employer will not be enough to purchase the fuel needed for the desired trip without requiring additional funds from a linked monetary account to purchase additional carbon credits after his or her present carbon account balance is exhausted. Fortunately, the price of a carbon credit has fallen from $14 to around $10/carbon credit, and accordingly the commuter 102 may decide that he or she can still afford to take the desired trip and cover both of the necessary monetary and carbon credit costs associated therewith.

Thus, within our exemplary scenario, commuter 102 commences on his or her trip, and halfway through the trip stops at the filling station 108 station and purchases gasoline at a composite monetary price of $5.75/gallon and a carbon price of 0.25C/gallon from the green fuel pump 112, which automatically debits monetary and carbon accounts of the commuter 102 according to the present invention. While providing fuel, the pump 112 determines that the commuter 102 carbon credit account becomes exhausted; the pump 112 stops fueling and notifies the commuter 102 through its display 116 and/or speaker 114 that "Your carbon credit account is empty. Do you want to proceed and purchase carbon credits at $10.75/C?" Upon the commuter 102 entering a "yes" response through the pump interface 120 the pump 112 resumes fueling and completes the transaction, sending a buy signal for 2C to a carbon sequestration entity in a rainforest (e.g. a subsidiary of the station 108 owner or operator or a third party).

Continuing the exemplary scenario, the carbon sequestration entity is able to produce carbon credits using a new method for $6USD/C and sell them to the station 108 entity for $8.50/C. The station 108 entity is also running a promotion, passing some of these savings on to their customers in the form of a carbon credit rebate for certain specified amounts of carbon credits spent at their stations. The pump 112 now notifies the commuter 102 on the display 116 and/or through the audio speakers 114 another message 128: "Congratulations! You have just received a 2C rebate from us as a result of spending 200C in fuel purchases during the present reward period. Thank you for being a loyal customer!" Thus according to the present invention the green fuel pump 112 automatically credits 2C back to the customer's account from a carbon credit subsidy account of the station 108 entity.

Thus in contrast to known command-driven carbon tonnage offset trading mechanisms, arbitrating devices and processes according to the present invention allow carbon to function as capital in a retail transaction, with a carbon credit account balance directly linked to a plurality monetary accounts held by (or provided on behalf of) each buying, selling, service provider and other party to a given transaction. Moreover, the value of carbon capital may be determined by market and economic forces, thus decoupled from centralized price setting. A carbon price of a good or service may be determined instead by a seller, based on the seller's own carbon costs incurred in manufacturing the good or providing the service. Additionally, the ability to automatically fund purchases with carbon credits or monetary funds renders these dual currencies interchangeable as a function of floating exchange rates.

Sellers who offset their own carbon usage with carbon sequestration or by purchasing carbon credits may also pass on these savings to customers according to the present invention as a market incentive, thus directly rewarding the clean, green or more efficient producer with economic advantage. Buyers who engage in "for-carbon" work activities are also provided with a means to spend earned carbon capital as they would normal currency. Flows of carbon capital are also established that direct carbon credits from sequestering entities to fossil carbon producers efficiently and directly through retail transactions. Further, a basis is created for carbon credits valuation to fall under the influence of carbon banking entities and economic principles currently governing worldwide monetary policies; in one aspect, information and data surrounding and generated by a composite pricing transaction may be used to aggregate economic data on carbon credit purchases and transactions for use by central carbon reserve bank entities in determining an exchange rate of carbon tonnage per carbon credit.

It will also be appreciated that some embodiments may be configured wherein fewer parties may participate in a transaction, or fewer accounts may be linked or provided. For example, a buyer need not have a carbon credit account in some embodiments, with one or more seller carbon accounts serving the functions described above: in one embodiment the green pump 112 uses messages 128 to inform the purchaser 102 of automatic carbon offsets acquired and accounted for by a seller station 108 in providing and selling the fuel, wherein the buyer may be motivated to purchase fuel from the station 108 through such knowledge. Also, in some embodiments, the seller station 108 does not act as a middleman in purchasing carbon offsets directly for a purchaser 102 from a third party carbon sequestering or banking entity, the purchaser 102 instead selecting and the third party and directly acquiring the credits needed to fund a purchaser 102 account in order to purchase fuel from the pump 112. Finally, a third party need not be involved if the purchaser 102 or seller station 108 maintains his or her own capacity to sequester carbon.

The linking, charging, debiting, crediting and subsidizing of dual accounts according to the present invention may comprise a variety of relationships and mechanisms. Facilitating the exchange, conversion and movement of credits from one type of account to another enables retail sellers to debit credits from either or both of the monetary and carbon credit types of accounts, in some example as function of current pricing as well as current product carbon footprint determinations. By providing for automatic carbon offsetting by a seller, the present invention allows a seller to rapidly and automatically offset a carbon credit price incurred by customers in promoting a product, sometimes without knowledge of the buyer if desired.

Figure 4:
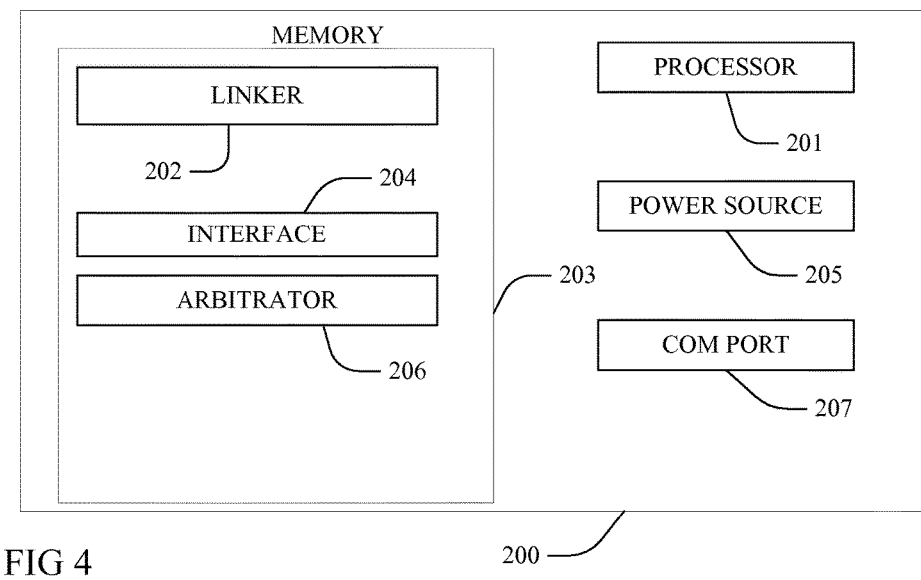
FIG. 4 is a block diagram of a system or device configured to link and utilize monetary and carbon credit accounts in consideration of a transaction according to the present invention.

FIG. 4 illustrates a programmable arbitrating device or module 200 configured to link and utilize monetary and carbon credit accounts in consideration of a transaction according to the present invention, for example as illustrated in FIGS. 1-3 and described above. The device 200 may be incorporated into a larger system (such as one provided by a service provider) wherein other applications and components of the larger system accomplish systems and methods according to the present invention, or it may be a stand-alone device or module 200 configured to perform each of the systems and methods described above. The present embodiment comprises a central processing unit (CPU) or other processing means 201 in communication with a memory 203 comprising logic components that enable the CPU 201 to perform processes and methods according to the present application, as will be understood through reference to FIGS. 1-3 as discussed above. Thus, the memory 203 comprises a carbon credit-monetary account linker logic component 202 configured to link various carbon credit and monetary accounts for debiting and crediting operations; an interface logic component 204 configured to present input interfaces and output messages for composite pricing and purchasing inputs, including as a function of buyer, seller and service provider preferences; and an arbitrator logic component 206 configured to arbitrate between the linked carbon credit and monetary accounts and effect account transfers as function of exchange rates and preferences.

A power source 205 is configured to provide operative power to the device 200; examples include battery units 205 and power inputs configured to receive alternating or direct current electrical power, and other appropriate power units 205 will be apparent to one skilled in the art. A communication port or network link/node means ("com port") 207 is also provided and configured to enable data and other communications with entities administering each of the linked accounts, exchange rate data, third party carbon offset and credit providers, and other devices, systems and monitoring, administrative and service provider entities as may be appropriate.

II. Computerized Implementation

Figure 5:
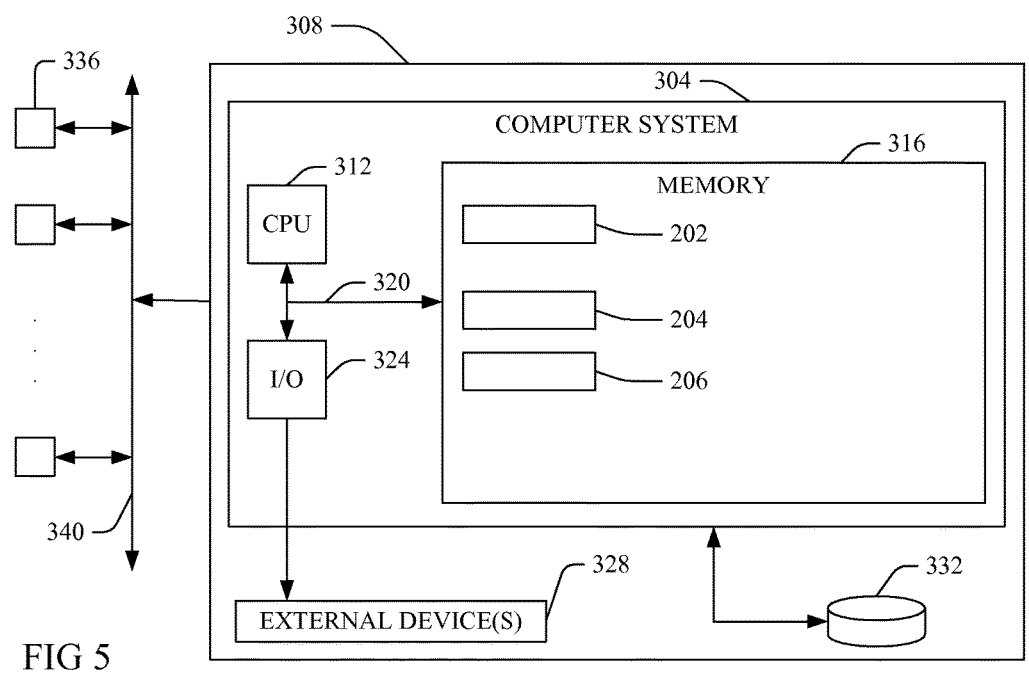
FIG. 5 is a block diagram illustrating a computerized implementation of a method and system for linking and utilizing monetary and carbon credit accounts in consideration of a transaction according to the present invention.

Referring now to FIG. 5, an exemplary computerized implementation of the present invention includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the process and systems, and devices as illustrated in FIGS. 1-3 and described above, including the account linker logic component 202, the interface logic component 204, and the arbitrator logic component 206 discussed above, and which are stored in memory 316 and/or storage system 332. It is to be appreciated that two or more, including all, of these components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboards, pointing devices, displays, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 4 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to implement methods, systems and devices according to the present application, for example as illustrated in FIGS. 1-4 above and described otherwise herein. To this extent, the computer-readable/useable medium includes program code that implements each of the various process steps of the present application. It is understood that the terms "computer-readable medium" or "computer useable medium" comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.).

Still yet, computer infrastructure 308 is intended to demonstrate that some or all of the components of implementation according to the present application could be deployed, managed, serviced, etc. by a service provider who offers to implement, deploy, and/or perform the functions of the present invention for others, for example by licensing methods and browser or application server technology to an internet service provider (ISP) or a cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the present application for one or more customers, and in return the service provider can receive payment from the customer(s) under a subscription and/or fee agreement and/or the service provider can receive payment from the sale of advertising content to one or more third parties.

In still another embodiment, the invention provides a computer-implemented method for enabling the processes, methods and devices according to the present application. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for linking and utilizing monetary and carbon credit accounts in consideration of a transaction, comprising:
 a programmable arbitrating device providing a transaction interface to a buyer that links a monetary account of the buyer to a carbon credit account of the buyer; and
 the arbitrating device automatically executing a purchase of an item offered for sale to the buyer by a seller at a composite price that has a monetary portion and a carbon credit portion, in response to an input of the buyer to the arbitrating device transaction interface as a function of a monetary-carbon exchange rate, by:
 comparing the monetary-carbon exchange rate to a rate threshold;
 in response to the monetary-carbon exchange rate meeting the compared rate threshold, charging a first monetary payment from the buyer's monetary account, charging a first carbon credit payment from the buyer's carbon credit account and converting a first amount of a balance of a selected one of the monetary and carbon credit account to generate a first converted monetary/carbon credit payment as a function of the monetary-carbon exchange rate, so that a percentage of a monetary payment amount relative to a carbon credit payment amount in a total of the first monetary payment, the first carbon credit payment and the first converted monetary/carbon credit payment satisfies a specified carbon credit/monetary proportion that is associated with the rate threshold; and
 in response to the monetary-carbon exchange rate not meeting the compared rate threshold, charging a second monetary payment from the buyer's monetary account that is different from the first monetary payment, and charging a second carbon credit payment from the buyer's carbon credit account that is different from the first carbon credit payment.

2. The method of claim 1, wherein the total of the first monetary payment, the first carbon credit payment and the first converted monetary/carbon credit payment, and a total of the second monetary payment and the second carbon credit payment, are each less than the composite price by a remainder amount; and
 wherein the method further comprises:
 the arbitrating device causing the seller to subsidize the remainder of the composite price by automatically requiring the seller to debit at least one of:
 a monetary subsidy account of the seller for a monetary value of the remainder; and
 a carbon credit subsidy account of the seller for a carbon credit value of the remainder;
 and
 wherein the arbitrating device is configured to automatically cause the seller to subsidize the remainder without requiring a further action by the buyer.

3. The method of claim 2, further comprising the arbitrating device automatically determining at least one of:
 the monetary value of the remainder from a carbon credit value of the remainder as a function of the monetary-carbon exchange rate; and
 the carbon credit value of the remainder from a monetary value of the remainder as a function of the monetary-carbon exchange rate.

4. The method of claim 2, further comprising the arbitrating device automatically financing at least one of:
 the debiting of the seller's monetary subsidy account by automatically selling carbon credits from the seller's carbon credit subsidy account to a carbon credit purchasing entity in communication with the arbitrating device as a function of the monetary-carbon exchange rate and crediting proceeds into the seller's monetary subsidy account, wherein the proceeds equal the debiting of the seller's monetary subsidy account; and
 the debiting of the seller's carbon credit subsidy account by automatically purchasing carbon credits from a carbon credit supplier entity in communication with the arbitrating device as a function of the monetary-carbon exchange rate, wherein the purchased carbon credits equals the debiting of the seller's carbon credit subsidy account.

5. The method of claim 4, further comprising a service provider providing the arbitrating device.

6. The method of claim 5, wherein the buyer's monetary account and the buyer's carbon credit account are established by a credit card provider as separate sub-accounts in the buyer's name.

7. The method of claim 5, further comprising the arbitrating device communicating with the carbon credit supplier entity or the carbon credit purchasing entity through a Transmission Control Protocol/Internet Protocol link.

8. The method of claim 5, wherein the arbitrating device is a fuel pump, the method further comprising:
 sending a signal to the carbon credit supplier entity or the carbon credit purchasing entity in response to a fueling activity by a pump user;
 mapping the signal to a fueling observation; and
 setting an amount of carbon credits of the total consideration relative to an amount of monetary value of the total consideration as a function of the mapping.

9. The method of claim 8, wherein the fueling activity is:
 presenting an account card associated with at least one of the buyer's monetary and carbon credit accounts to a pump interface;
 turning on the pump;
 selecting a fuel grade; or
 operating a fuel pump spout; and
 wherein the fueling observation is:
 a quantity of fuel purchased;
 a kind of fuel purchased;
 a time of day of fueling;
 a temperature;
 an elapsed time the pump user operated the fuel pump spout; or
 an elapsed time the pump user left the fuel pump spout in a vehicle tank.

10. An article of manufacture, comprising:
 a computer readable tangible storage device having computer readable program code embodied therewith, the program code comprising instructions which, when executed by a computer processing unit, cause the processing unit to:
 link a buyer's monetary account and a buyer's carbon credit account and to provide a transaction interface to a buyer; and
 execute a purchase of an item as a function of a monetary-carbon exchange rate in response to an input from a buyer via the transaction interface, the item offered for sale to the buyer by a seller at a composite price having a monetary portion and a carbon credit portion, by, without requiring a further action by a buyer or a seller, automatically:
 comparing the monetary-carbon exchange rate to a rate threshold;

in response to the monetary-carbon exchange rate meeting the compared rate threshold, charging a first monetary payment from the buyer's monetary account, charging a second carbon credit payment from the buyer's carbon credit account and converting a first amount of a balance of a selected one of the monetary and carbon credit account to generate a first converted monetary/carbon credit payment as a function of the monetary-carbon exchange rate, so that a percentage of a monetary payment amount relative to a carbon credit payment amount in a total of the first monetary payment, the first carbon credit payment and the first converted monetary/carbon credit payment satisfies a specified carbon credit/monetary proportion that is associated with the rate threshold; and in response to the monetary-carbon exchange rate not meeting the compared rate threshold, charging a second monetary payment from the buyer's monetary account that is different from the first monetary payment, and charging a second carbon credit payment from the buyer's carbon credit account that is different from the first carbon credit payment.

11. The article of manufacture of claim 10, wherein the total of the first monetary payment, the first carbon credit payment and the first converted monetary/carbon credit payment, and a total of the second monetary payment and the second carbon credit payment, are each less than the composite price by a remainder amount; and wherein the program code instructions, when executed by the computer processing unit, further cause the computer processing unit to:

cause the seller to subsidize the remainder of the composite price by automatically, without requiring a further action by the buyer, requiring the seller to debit at least one of:

a monetary subsidy account of the seller for a monetary value of the remainder; and a carbon credit subsidy account of the seller for a carbon credit value of the remainder.

12. The article of manufacture of claim 11, the program code comprising instructions which, when executed by the processing unit, causes the processing unit to automatically determine at least one of:

the monetary value of the remainder from a carbon credit value of the remainder as a function of the monetary-carbon exchange rate; and the carbon credit value of the remainder from a monetary value of the remainder as a function of the monetary-carbon exchange rate.

13. The article of manufacture of claim 11, the program code comprising instructions which, when executed on the processing unit, causes the processing unit to automatically finance at least one of:

debiting of the seller's monetary subsidy account by automatically selling carbon credits from the seller's carbon credit subsidy account to a carbon credit purchasing entity in communication with the computer system as a function of the monetary-carbon exchange rate and crediting proceeds into the seller's monetary subsidy account, wherein the proceeds equal the debiting of the seller's monetary subsidy account; and debiting of the seller's carbon credit subsidy account by automatically purchasing carbon credits from a carbon credit supplier entity in communication with the computer system as a function of the monetary-carbon exchange rate, wherein the purchased carbon credits equals the debiting of the seller's carbon credit subsidy account.

14. A programmable device comprising:

a processing unit;

a computer-readable memory in communication with the processing unit;

a tangible computer-readable storage device in communication with the processing unit; and a network interface in communication with the processing unit and the memory;

wherein the processing unit, when executing program instructions stored on the tangible computer-readable storage device via the computer-readable memory:

links a buyer's monetary account and a buyer's carbon credit account and provides a transaction interface to a buyer; and executes a purchase of an item as a function of a monetary-carbon exchange rate in response to an input from a buyer via the transaction interface, the item offered for sale to the buyer by a seller at a composite price having a monetary portion and a carbon credit portion, by, without requiring a further action by a buyer or a seller, automatically:

comparing the monetary-carbon exchange rate to a rate threshold;

in response to the monetary-carbon exchange rate meeting the compared rate threshold, charging a first monetary payment from the buyer's monetary account, charging a first carbon credit payment from the buyer's carbon credit account and converting a first amount of a balance of a selected one of the monetary and carbon credit account to generate a first converted monetary/carbon credit payment as a function of the monetary-carbon exchange rate, so that a percentage of a monetary payment amount relative to a carbon credit payment amount in a total of the first monetary payment, the first carbon credit payment and the first converted monetary/carbon credit payment satisfies a specified carbon credit/monetary proportion that is associated with the rate threshold; and in response to the monetary-carbon exchange rate not meeting the compared rate threshold, charging a second monetary payment from the buyer's monetary account that is different from the first monetary payment, and charging a second carbon credit payment from the buyer's carbon credit account that is different from the first carbon credit payment.

15. The programmable device method of claim 14, wherein the total of the first monetary payment, the first carbon credit payment and the first converted monetary/carbon credit payment, and a total of the second monetary payment and the second carbon credit payment, are each less than the composite price by a remainder amount; and wherein the programmable unit when executing the program instructions stored on the tangible computer-readable storage device, further:

causes the seller to subsidize a remainder of the composite price by automatically, without requiring a further action by the buyer, requiring the seller to debit at least one of:

a monetary subsidy account of the seller for a monetary value of the remainder; and a carbon credit subsidy account of the seller for a carbon credit value of the remainder.

16. The programmable device of claim 15, wherein the programmable unit when executing the program instructions stored on the tangible computer-readable storage device, further automatically determines at least one of:
   the monetary value of the remainder from a carbon credit value of the remainder as a function of the monetary-carbon exchange rate; and
   the carbon credit value of the remainder from a monetary value of the remainder as a function of the monetary-carbon exchange rate.

17. The programmable device of claim 15, wherein the programmable unit when executing the program instructions stored on the tangible computer-readable storage device, further automatically:
   debits the seller's monetary subsidy account by automatically selling carbon credits from the seller's carbon credit subsidy account to a carbon credit purchasing entity in communication with the programmable device as a function of the monetary-carbon exchange rate and crediting proceeds into the seller's monetary subsidy account, wherein the proceeds equal the debiting of the seller's monetary subsidy account; and
   debits the seller's carbon credit subsidy account by automatically purchasing carbon credits from a carbon credit supplier entity in communication with the programmable device as a function of the monetary-carbon exchange rate, wherein the purchased carbon credits equals the debiting of the seller's carbon credit subsidy account.

* * * * *